United States Patent [19]

Nishikawa

[11] Patent Number: 4,771,853
[45] Date of Patent: Sep. 20, 1988

[54] METHOD AND APPARATUS FOR CONTROLLING FOUR-WHEEL DRIVE VEHICLES

[75] Inventor: Seiichi Nishikawa, Toyokawa, Japan
[73] Assignee: Toyota Jidosha Kabushiki Kaisha, Aichi, Japan
[21] Appl. No.: 39,176
[22] Filed: Apr. 17, 1987
[30] Foreign Application Priority Data
Apr. 17, 1986 [JP] Japan .............................. 61-088707
[51] Int. Cl.$^4$ ............................................. B60K 17/34
[52] U.S. Cl. ..................................... 180/247; 74/866;
74/878; 364/424.1
[58] Field of Search .................. 180/247, 233; 74/866, 74/867, 878; 364/424.1

[56] References Cited

U.S. PATENT DOCUMENTS 4,407,387 10/1983 Lindbert ........................ 180/247 X
4,452,331 6/1984 Lunn et al. .......................... 180/247
4,688,449 8/1987 Harada et al. .................. 180/247 X Primary Examiner—John A. Pekar
Attorney, Agent, or Firm—Parkhurst, Oliff & Berridge

[57] ABSTRACT

Herein disclosed is a method and apparatus for controlling a four-wheel drive vehicle wherein said method hydraulically controls a distribution of a drive force between the front and rear wheels of a four-wheel drive vehicle and a change of the gear ratio of an automatic transmission of the vehicle. After either the drive force distribution control or the gear ratio change control has been started, the other control is forbidden until a predetermined condition is satisfied. This control is either the lapse of a predetermined period of time or the end of one of the controls which is determined by the result of a comparison of the number of revolutions of the transmission or the result of a comparison of the hydraulic pressure.

19 Claims, 8 Drawing Sheets

METHOD AND APPARATUS FOR CONTROLLING FOUR-WHEEL DRIVE VEHICLES

BACKGROUND OF THE INVENTION

The present invention relates to a method for controlling a part- or full-time four-wheel drive vehicle and, more particularly, to a four-wheel drive vehicle controlling method in which distribution of the drive force to the front and rear wheels and change of the transmission gear ratios or positions are undergone by a hydraulic pressure control.

Regular small-sized vehicles have recently been equipped with four-wheel drive because of their advantageous running stability. The four-wheel drive can be classified into a part-time type, in which transmission of the drive force to the front or rear wheels can be interrupted at will, and a full-time type, in which the drive force is always distributed to both the front and rear wheels through a differential. In the prior art, these types of four-wheel drives are also combined with an automatic transmission and an auxiliary transmission which can shift the output of the automatic transmission between high and low speeds.

This combination has been proposed by an automatic transmission for the four-wheel drive with an auxiliary transmission, which is exemplified by Japanese Patent Application No. 7772/1985. This proposal is constructed of: a main transmission for changing the gear ratios by switching the manual valve with the shift lever and by switching the hydraulic pressure supply lines in response to signals such as the throttle openings or the number of revolutions of the output shaft; an auxiliary transmission for shifting the output of the main transmission between a high-speed drive, having a reduction gear ratio of 1, and a low-speed drive, having a reduction gear ratio larger than 1, by controlling applications and releases of the clutch and the brake through the hydraulic pressure control; and a transfer for shifting the two- and four-wheel drives by controlling application and release of the clutch through the hydraulic pressure control. In this automatic transmission, the valves of the hydraulic pressure control unit are switched depending upon the throttle openings and the number of revolutions of the output shaft to automatically change the gear ratios of the main transmission. If one of the drive modes including a high-speed two-wheel drive (H2), a high-speed four-wheel drive (H4) and a low-speed four-wheel drive (L4) is selected by the shift lever of the auxiliary transmission, the values in the hydraulic pressure control unit for the auxiliary transmission are switched to cause engagement or release of the clutch and the brake. This brings the auxiliary transmission into the high- or low-speed drive mode and the transfer into the two- or four-wheel drive mode.

Generally in the automatic transmission, the hydraulic pressure established by an oil pump is regulated to a line pressure by a primary regulator valve and to a throttle pressure, depending upon the throttle openings, by a throttle valve. These regulated hydraulic pressures are used to actuate various valves and hydraulic servos. As a result, the gear ratio changing controls are performed with proper timings or by proper operating forces. In the auxiliary transmission, also, the shifting controls are performed under predetermined hydraulic pressure. In the automatic transmission thus operated, however, a shifting (e.g., upshifting or downshifting) is automatically caused in the main transmission by the changes in the throttle openings and accordingly in the vehicle speed, whereas the drive modes are shifted between the two- and four-wheel drives independently of the shifting, by the manual selection of the shift lever. This may result in simultaneous occurrence of the gear ratio change at the main transmission and the change between the four- and two-wheel drives at the transfer. In case a shift is to be made from the high-speed two-wheel drive to the low-speed four-wheel drive, moreover, the auxiliary transmission is required to supply the hydraulic pressure not only to the clutches and brakes for the high- to low-speed drive shift but also to the clutches for the four-wheel drive. Thus, in the case of the simultaneous occurrence of the gear ratio change at the main transmission and the shift of the drive mode from the high-speed two-wheel drive to the low-speed four-wheel drive at the auxiliary transmission and the transfer or in the case of the simultaneous occurrence of the shift from the high-speed drive to the low-speed drive at the auxiliary transmission and the shift from the two-wheel drive to the four-wheel drive at the transfer, the number of the hydraulic elements to be supplied with the hydraulic pressure is temporarily increased. If, in this case, an accumulator is disposed in the supply passage of the hydraulic pressure, the hydraulic pressure supply must be notably increased. In either case, the hydraulic pressure will drop to a level lower than the designed value. As a result, the automatic transmission of the prior art has failed to set the engaging timings and/or forces of the clutches, brakes and so on, as desired. This may be accompanied by disturbances in the hydraulic characteristics of the transmission and accordingly encountered by difficulties in improvements in the gear ratio changing shocks or in fine adjustments of the torque distribution, thus raising the possibility of losing the smooth gear ratio changing characteristics and the expected merit of the four-wheel drive vehicle.

SUMMARY OF THE INVENTION

It is, therefore, an object of the present invention to provide a method for controlling a four-wheel drive vehicle, which makes the changing controls of gear ratios and the distributions of the drive force for the four-wheel drive and so on possible without resulting in any reduction in the hydraulic pressure.

Another object of the present invention is to provide a control method for a four-wheel drive vehicle which is free from any disturbance in the hydraulic characteristics of an automatic transmission so that it can improve the gear ratio changing shocks and adjust the torque distribution finely.

A further object of the present invention is to provide a control method for a four-wheel drive vehicle which can assure smooth gear ratio changing and the advantage of the four-wheel drive.

In order to achieve the above-specified objects, according to the present invention, there is provided a control method for a four-wheel drive vehicle which performs the hydraulic pressure controls for changing the gear ratios of an automatic transmission and for distributing the drive force such that, after the hydraulic pressure control is applied either to one of the gear ratio change or to the drive force distribution, the hydraulic pressure control for the other is forbidden until a predetermined condition is satisfied.

Here, the "gear ratio change of the transmission" means not only the change of the gear ratio by the manual selection of the shift lever but also an automatic change of the gear ratio to be controlled depending upon data such as the throttle openings or the number of revolutions of the output shaft. The "drive force distribution" means not only the shift between the two- and four-wheel drives through applications and releases of the clutches but also an adjustment of the distribution ratio of the drive force between the front and rear wheels through the slip control of friction engagement devices. Moreover, the "commencement of the control" means the commencement of changes such as rises in the hydraulic pressure in the supply passage in response to signals and objects to be controlled, and the commencement of changes in the number of revolutions of and the torques of the revolving members acting as the objects, but should not be limited to the commencement of changes of the behaviors of the objects. On the other hand, the "condition" can include the lapse of a predetermined period of time and the end of a control commenced previously, and the "end of the control" can be determined by the result of a comparison of either the number of revolutions in the transmission or the level of the hydraulic pressure.

According to the method of the present invention, therefore, after one of the controls for the gear ratio change and the drive force distribution has commenced, the other control is forbidden and reserved for a predetermined time period. After such time the hydraulic pressure is restored to the previously forbidden control. As a result, both controls can be accomplished stably and precisely under designed hydraulic pressures.

BRIEF DESCRIPTION OF THE DRAWINGS

Other objects, features and advantages of the present invention will become apparent from the following description taken with reference to the accompanying drawings, in which.

DESCRIPTION OF THE PREFERRED EMBODIMENTS

Figure 1:
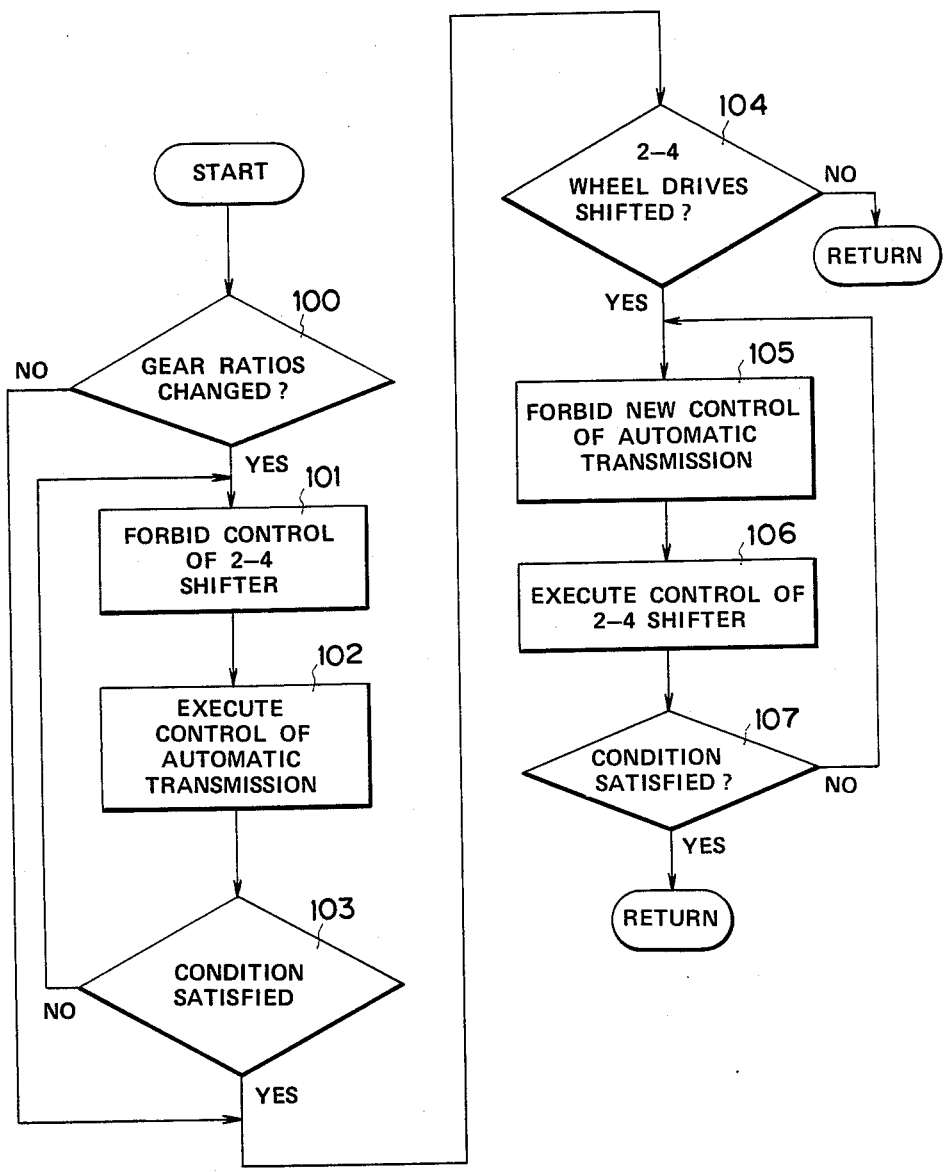
FIG. 1 is a flow chart showing one embodiment of the method of the present invention.
Figure 2:
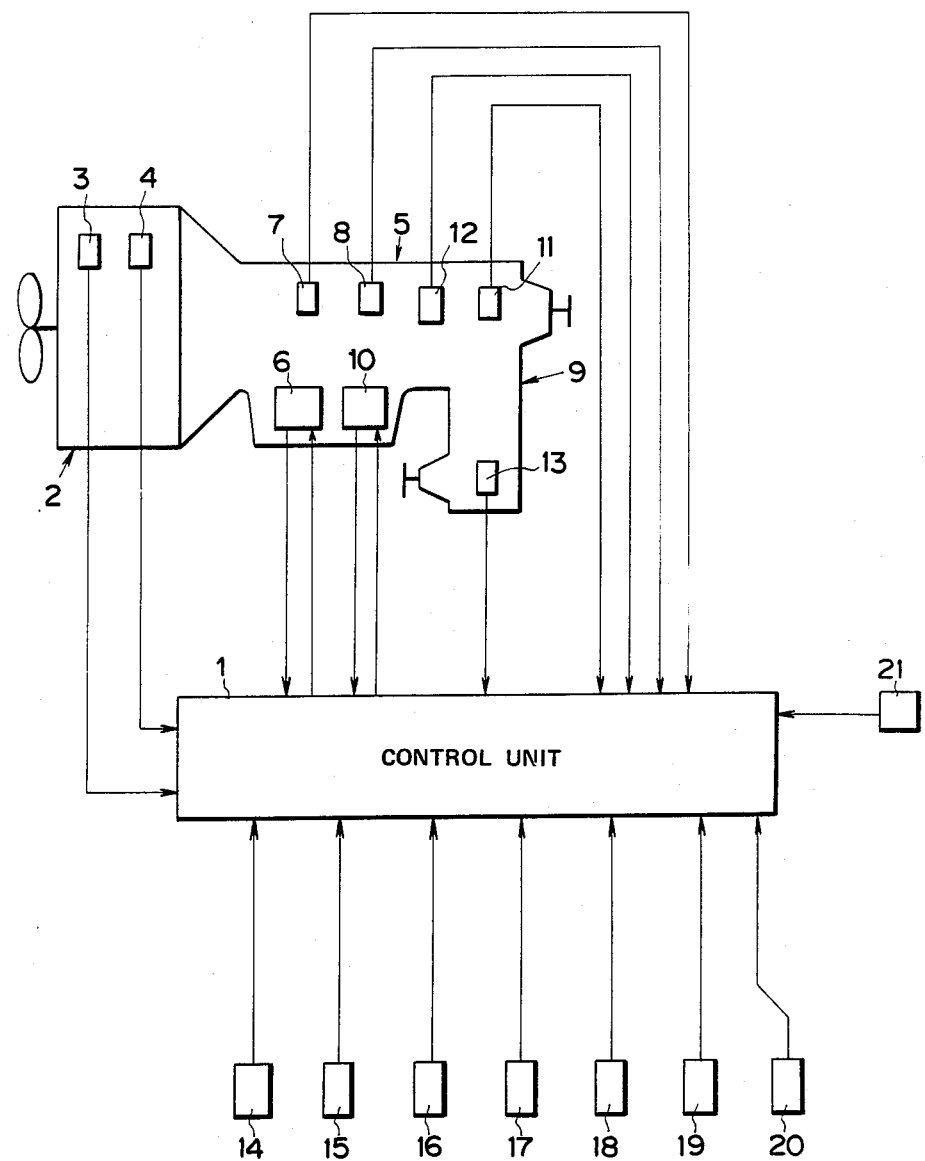
FIG. 2 is a schematic block diagram showing a system for carrying out the control method of FIG. 1.

The present invention will be described in the following in connection with the embodiments thereof with reference to the accompanying drawings. FIG. 1 is a flow chart for describing one embodiment of the method of the present invention. In this method, the control for the gear ratio changes in the automatic transmission and the control for the drive force distribution in the two- and four-wheel drive shifting device are associated with each other. This method may preferably be implemented by the electrical control system which is schematically shown in FIG. 2. Denoted at reference numeral 1 in FIG. 2 is a control unit which is constructed mainly of a microcomputer. This control unit 1 receives signals from a throttle opening sensor 3 and an engine revolution sensor 4 from an engine 2. In an automatic transmission 5, on the other hand, a transmission controller 6 is operated in response to an output signal from the control unit 1. In order to grasp the operating mode of the automatic transmission 5, the signals from a transmission rotation sensor 7 and a transmission operation sensor 8 are inputted to the control unit 1. Here, automatic transmission 5 and its controller 6 can be exemplified by those disclosed in the aforementioned specification of Japanese Patent Application No. 7772/1985. In these transmission and controller, the manual valve is switched by the shift lever whereas the various valves are switched in accordance with the throttle openings and the number of revolutions of the output shaft so that the gear ratios are automatically changed. Therefore, the transmission operation sensor 8 may be exemplified by a pressure switch which detects the hydraulic pressure to be applied to the brakes and clutches for changing the gear ratios. On the other hand, a two- and four-wheel drive shifting device (hereinafter referred to as a "2–4 shifter") 9 operates a 2–4 shifter controller 10 in response to an output signal of the control unit 1. In order to grasp the operating mode of the 2–4 shifter controller 10, the control unit 1 receives the signals of a 2–4 shifter operation sensor 11, a rear wheel speed sensor 12 and a front wheel speed sensor 13. Here, in the system of Japanese Patent Application No. 7772/1985 the two- and four-wheel drives are shifted by hydraulically engaging and releasing the clutches. Therefore, the 2–4 shifter operation sensor 11 may be exemplified by a pressure switch for detecting the hydraulic pressure for the clutches. The control unit 1 further receives signals from a transmission shift position sensor 14, a 2–4 shifter shift position sensor 15, a left wheel revolution sensor 16, a right wheel revolution sensor 17, a steering angle sensor 18, a road surface sensor 19, a gradient sensor 20 and a brake operation sensor 21.

In the system described above, for example, if the shift lever for the automatic transmission is shifted from the D range to the 2nd range and the shift lever for the 2–4 shifter is shifted from the two- to four-wheel drives, the corresponding signals are inputted from the shift position sensors 14 and 15, respectively, to the control unit 1. In this control unit 1, as shown in FIG. 1, it is determined (at a step 100) in accordance with the received signal whether or not the gear ratios are changed. If YES, the shifting control of the 2–4 shifter 9 is forbidden (at a step 101). This is executed by outputting the signal to the 2–4 shifter controller 10 from the control unit 1. More specifically, this forbidding operation may be executed in the following manner if the 2–4 shifter 9 is constructed mainly of a clutch C-4 and its controller 10 as shown in FIG. 3.

Figure 3:
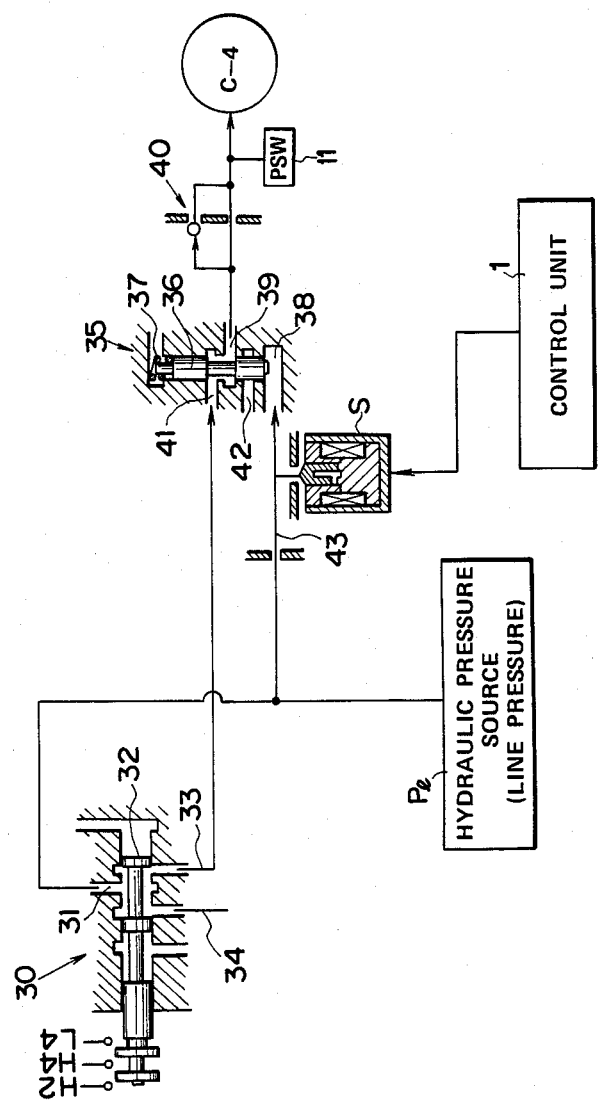
FIG. 3 is a schematic view showing one example of a control unit to be used with a device for shifting the two- and four-wheel drives.

In FIG. 3, a manual valve 30 is used to select one of the drive modes including a high-speed two-wheel drive (H2), a high-speed four-wheel drive (H4) and a low-speed four-wheel drive (L4). The manual valve 30 has a mechanism such that a port 31 communicating with a hydraulic pressure source P1 for establishing a line pressure is caused to selectively communicate with a four-wheel drive port 33 and an auxiliary transmission port 34 as a spool 32 moves. The fourwheel drive port 33 communicates with a timing valve 35. This timing valve 35 has a spool 36 and a spring 37 at its one end and an oil chamber 38 at its other end and has its outlet port 39 connected to the two- and four-wheel drive shifting clutch C-4 through a flow control valve 40 having a check valve. Moreover, the timing valve 35 has its spool 36 biased by the spring 37 to have its inlet port 41 closed and its outlet port 39 opened to communicate with a drain port 42 so that the hydraulic pressure on the clutch C-4 is released. If the line pressure is applied to the oil chamber 38, the spool 36 is moved to the one end while compressing the spring 37 so that the communication between the inlet port 41 and the outlet port 39 is restored to apply the hydraulic pressure to the clutch C-4. At the same time, the timing valve 35 has its oil chamber 38 communicating with the hydraulic pressure source P1 via an oil passage 43. This oil passage 43 is equipped with a solenoid valve S which is disposed just upstream of the oil chamber 38. This solenoid valve S is coupled to the aforementioned control unit 1 for opening its port, when magnetized by energizing its coil, to release the pressure from the oil passage 43, i.e., from the oil chamber 38 and for closing its port, when deenergized, to feed the line pressure from the oil passage 43 to the oil chamber 38. Incidentally, a pressure switch PSW acting as the 2-4 shifter operation sensor 11 is interposed between the clutch C-4 and the flow control valve 40 with the check valve. In the construction shown in FIG. 3, therefore, if the manual valve 30 is set at the H4 or L4 mode, the port 31 communicates with the four-wheel drive port 33 to feed the line pressure to the inlet port 41 of the timing valve 35. If the solenoid valve S is energized and turned on, the pressure is released from the oil chamber 38 of the timing valve 35 so that the spool 36 moves downward, as viewed from FIG. 3. As a result, the inlet port 41 is closed to prevent line pressure from being applied to the clutch C-4 so that the clutch C-4 is held in its released state, thereby preventing the four-wheel drive.

After the shifting control of the 2-4 shifter 9 has been forbidden, the control for changing the gear ratios by the automatic transmission 5 is executed (at a step 102). This changing control is performed, for example, by switching the manual valve in the automatic transmission controller 6 to switch the supply passage of the line pressure thereby actuating the clutches or brakes of the automatic transmission 5. The commencement of this control for changing the gear ratios is determined in terms of the output signal from the control unit 1 to the transmission controller 6, the output signal from the transmission rotation sensor 7, or the output signal from the transmission operation sensor 8. At a subsequent step 103, it is determined whether or not a predetermined condition has been satisfied after the execution of the control for the gear ratio change.

In short, the determining procedure of this step 103 is provided to reserve a subsequent control until the hydraulic pressure is free from fluctuations caused by the precedent gear ratio change and is stabilized. This determination can be conditioned by either the end of the control for the gear ratio change or the lapse of a predetermined period of time. Here, the end of the changing control can be determined by the result of a comparison of either the number of revolutions based upon the signal received by the transmission rotation sensor 7 or the hydraulic pressure based upon the signal received by the transmission operation sensor 8. On the other hand, the predetermined time period may be one that is determined by measuring the time period required for the hydraulic pressure to stabilize. If the determination result of step 103 is NO, the process flow is returned to step 101, and the forbiddance of the shifting control of the 2-4 shifter 9 is maintained.

Moreover, in case the determination result at step 103 is YES or in case the determination result at step 101 is NO, it is determined (at a step 104) whether or not the control responding to the signal inputted is to shift the two- and four-wheel drives. If the result of this determination step is NO, the process is returned to the initial step. If YES, on the contrary, a new control for changing the gear ratios of the automatic transmission is forbidden (at a step 105). This forbiddance can be achieved, for example, by maintaining the magnetizing and demagnetizing states of the individual solenoid valves by the transmission controller 6 as they are. With this control being forbidden, the shifting control of the 2-4 shifter 9 is executed (at step 106). This shifting control can be performed, in the example of FIG. 3, by deenergizing and demagnetizing the solenoid valve S to close its port. With this closing, the line pressure is supplied to the oil chamber 38 of the timing valve 35 to move the spool 36 upward, as seen from FIG. 3, so that the communication between the input port 41 and the output port 39 can be established to apply the line pressure to clutch C-4. Since, in this case, the hydraulic pressure has already been restored because the preceding gear ratio changing control was ended, the shifting control of the 2-4 shifter 9 is conducted as expected.

After the shifting control at step 106 has been started, moreover, it is determined (at a step 107) whether or not a predetermined condition is satisfied. This condition may be either the end of the shifting control or the lapse of a predetermined time period like the aforementioned condition at step 103. In this case, the end of the shifting control can be determined by either the determination result of comparing either the number of revolutions based on the output signals from the rear and front wheel speed sensor 12 and 13 or the hydraulic pressure based on the output signal from the 2-4 shifter operation sensor 11. If the result of the determination at step 107 is NO, the process flow is returned to the foregoing step 105, and a new forbiddance of the gear ratio changing control of the automatic transmission 5 is maintained. If the determined result is YES, on the contrary, the process flow is returned to the initial step.

Figure 4:
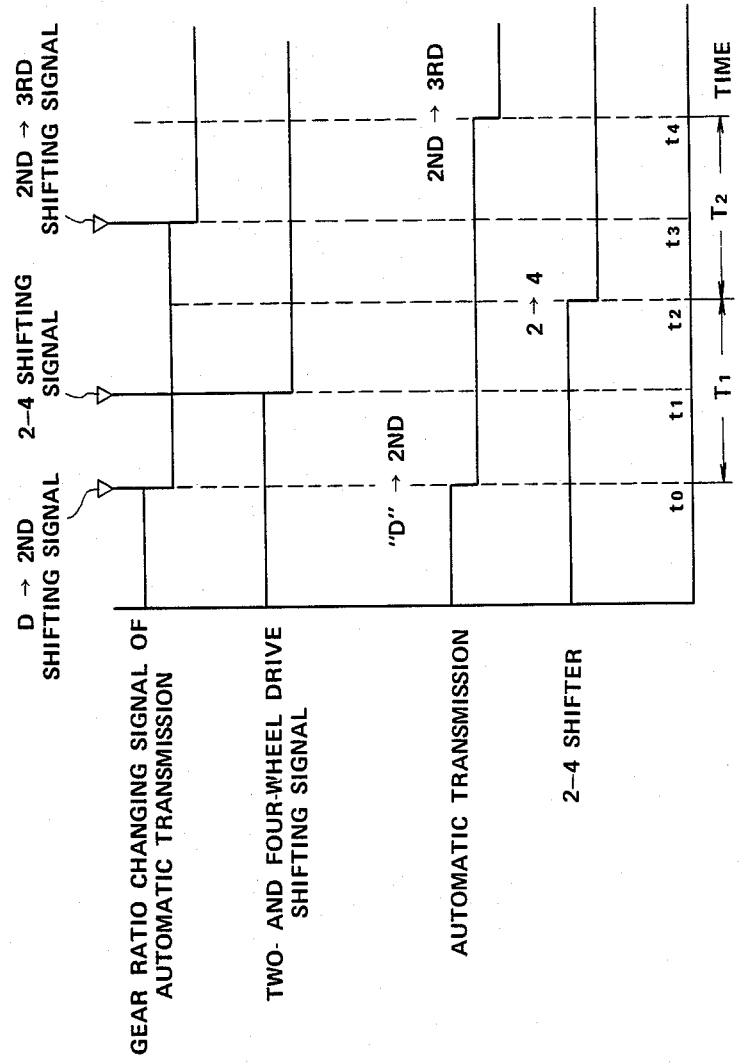
FIG. 4 is a time chart showing the method shown in FIG. 1.

FIG. 4 is a time chart showing the output timings of the individual changing and shifting signals and the operation timings of the automatic transmission 5 and the 2-4 shifter 9, which are experienced in the controls described above. If a shift is made from the two-wheel drive to the four-wheel drive immediately after a shift has been made from the D range to the 2nd range, the automatic transmission 5 and its controller 6 commence at a point of time $t_0$ their controls for changing the gear ratios in response to the D to 2nd range shift signal. Even if a two- to four-wheel drive shifting signal is generated at a point of time $t_1$ during a forbiddance period $T_1$ continuing from that point of time $t_0$ to the instant when the aforementioned condition is satisfied, the 2-4 shifter 9 is maintained in its present state. At a point of time $t_2$ when the forbiddance period $T_1$ elapses, the shifting operation of the 2-4 shifter 9 is commenced. During this operation, the automatic transmission is maintained in its present state, even if a 2nd to 3rd gear ratio changing signal, for example, is generated at a predetermined point of time $t_3$ within a forbiddance period $T_2$ continuing until a predetermined condition is satisfied. At a point of time $t_4$ when the forbiddance period $T_2$ elapses, the changing operation of the gear ratios is commenced. Consequently, both the gear ratio changing control and the two- and four-wheel drive shifting control are not simultaneously conducted during either of the forbiddance periods $T_1$ and $T_2$. As a result, both the gear ratio changing control and the two- and four-wheel drive shifting control are performed under a specified hydraulic pressure without resulting in any drop in the hydraulic pressure.

Incidentally, in the description thus far made, the determination of whether or not the change is for the gear ratios is made first, and the determination of whether or not the shift is for the two- and four-wheel drives is subsequently made. The order of precedence should not be limited thereto, but either determination may precede. Alternatively, the steps 100 to 103 and the steps 104 to 107 may be executed independently of each other. In this case, the routine responding to the signal inputted first is precedent.

Figure 5:
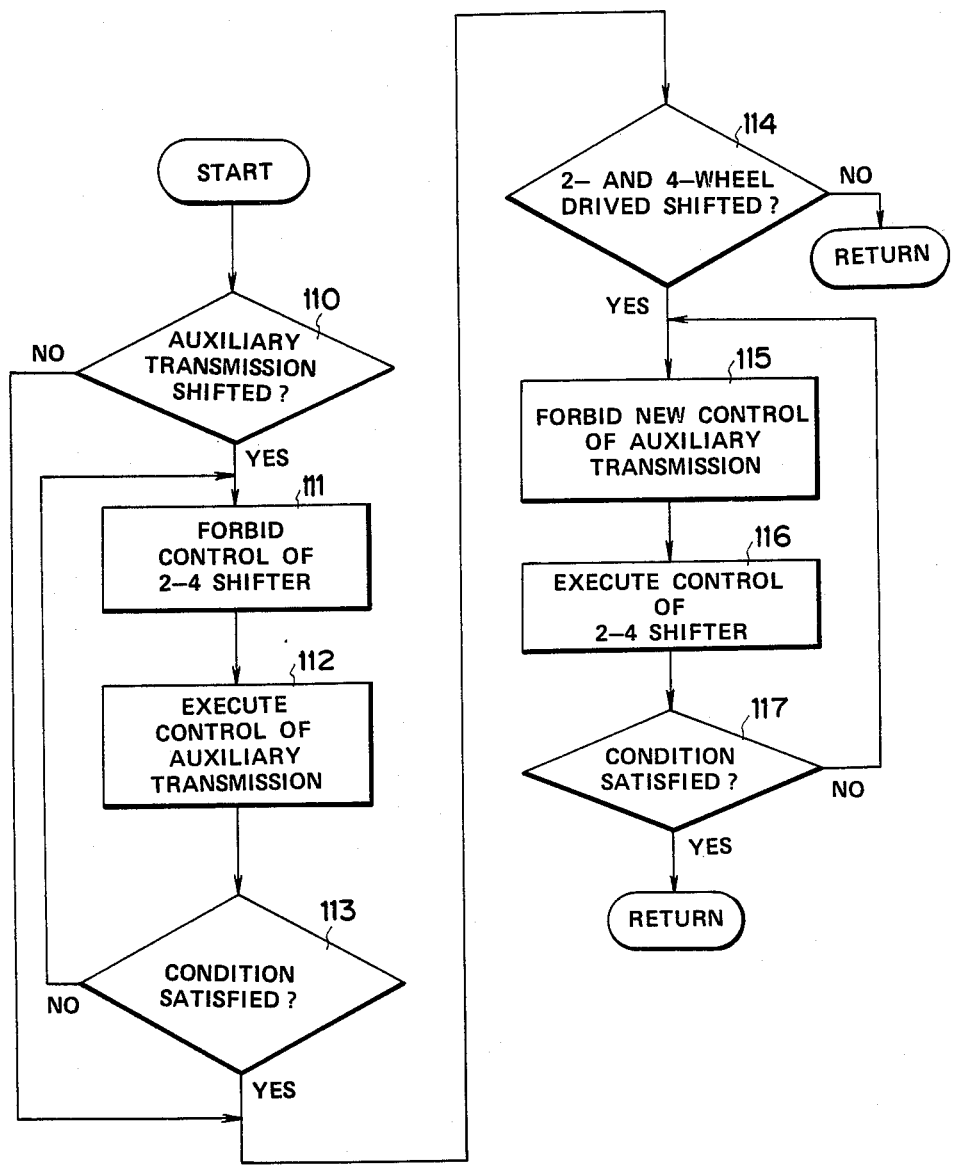
FIG. 5 is a flow chart showing another embodiment of the method according to the present invention.
Figure 6:
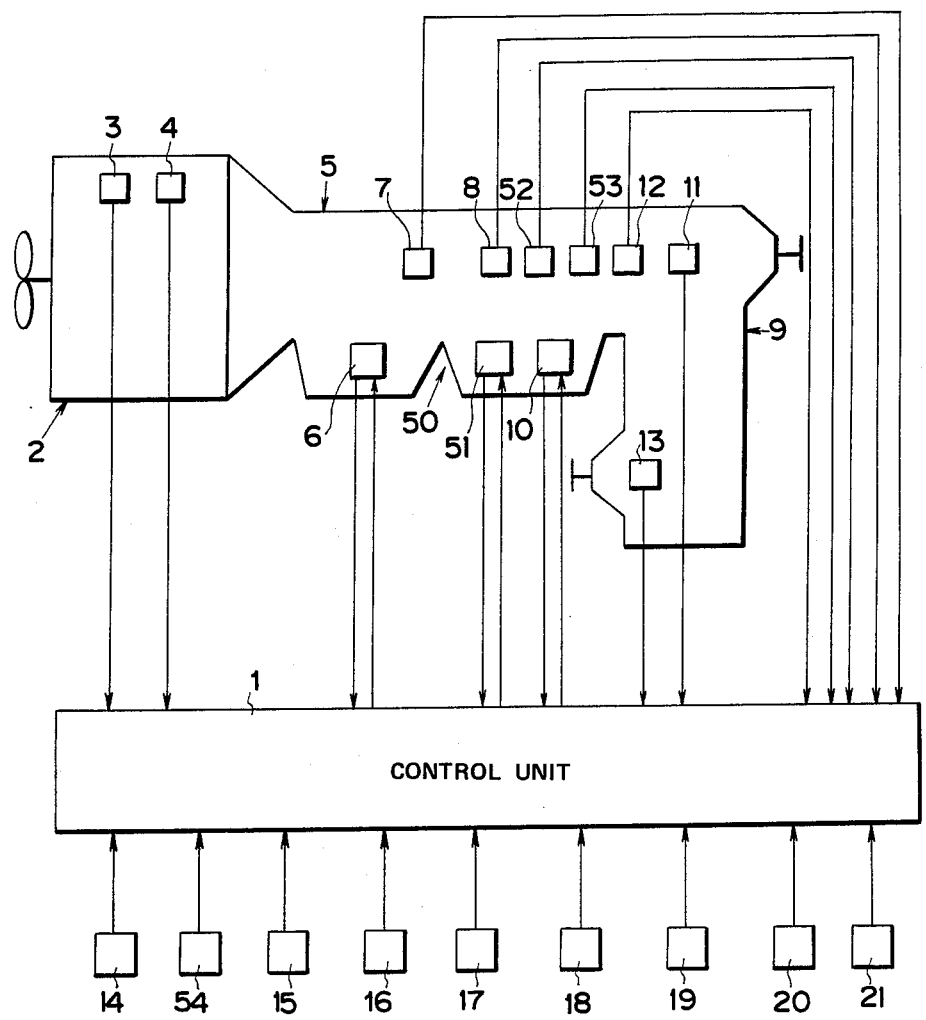
FIG. 6 is a schematic block diagram showing a system for carrying out the method of FIG. 5.

The embodiment thus far described is directed to a method for controlling the automatic transmission for automatically changing the gear ratios in accordance with the running mode and the 2-4 shifter 9 in association with each other. However, the method of the present invention can also be applied to the case in which the auxiliary transmission and the 2-4 shifter 9 are to be controlled in association with each other. Here, the auxiliary transmission is capable of shifting an inputted drive force between the high- and low-speed drives to output one of them. This auxiliary transmission and its controller can be specifically constructed, as is proposed by the aforementioned specification of Japanese Patent Application No. 7772/1985, for example. The method of the present invention for use with such four-wheel drive transmission is exemplified in FIG. 5, and a system for implementing this method may have a construction which is schematically shown in FIG. 6.

The system shown in FIG. 6 will be described at first in the following. This system is constructed by adding an auxiliary transmission 50 and its accessories to the foregoing system shown in FIG. 2. The auxiliary transmission 50 is disposed in front of the 2-4 shifter 9 and has its controller 51 controlled by the control unit 1. This control unit 1 receives the output signals of a rotation sensor 52 and an operation sensor 53 of the auxiliary transmission 50. The operation sensor 53 may be exemplified by a pressure switch for detecting the hydraulic pressure supplied to a gear ratio changing clutch or brake in case the auxiliary transmission 50 is made to have the construction disclosed in the aforementioned specification of Japanese Patent Application No. 7772/1985. Since this auxiliary transmission 50 is shifted by the operation of the shift lever, another signal is also inputted to the control unit 1 from an auxiliary transmission shift position sensor 54.

Incidentally, in the system thus constructed, the auxiliary transmission 50 and the 2-4 shifter 9 are shifted by the aforementioned manual valve 30 shown in FIG. 3. In this manual valve 30, the oil lines to the auxiliary transmission 50 and the 2-4 shifter 9 are switched in case a shift is made between the high-speed two-wheel drive (H2) and the low-speed four-wheel drive (L4).

In the system thus constructed, the aforementioned 2-4 shifter shift position sensor 15 and auxiliary transmission shift position sensor 54 feed their signals to the control unit 1 in case the shift levers for the auxiliary transmission and the 2-4 shifter are shifted from the high-speed two-wheel drive (H2) to the low-speed four-wheel drive (L4). In the control unit 1, as shown in FIG. 5, it is determined (at a step 110) on the basis of the inputted signals whether or not the shift of the high- to low-speed drive is made. If the auxiliary transmission shift position sensor 54 receives its signal prior to the 2-4 shifter shift position sensor 15, the result of the determination is YES so that the shifting control of the 2-4 shifter 9 is forbidden (at a step 111). Here, the shift control forbidding operation may be conducted like the foregoing embodiment which has been described with reference to FIG. 3. Next, the shifting control of the auxiliary transmission 50 is executed (at a step 112). This operation can be performed by energizing a predetermined solenoid valve of the auxiliary transmission controller, for example, to switch the supply passage of the hydraulic pressure. The commencement of the shifting control of the auxiliary transmission 50 is determined in terms of the output of the signal from the control unit 1 to the auxiliary transmission controller 51, the output signal from the auxiliary transmission rotation sensor 52 or the output signal from the auxiliary transmission operation sensor 53. After the start of the shifting control of the auxiliary transmission 50, it is determined at a subsequent step 113 whether or not a predetermined condition is satisfied. Like the foregoing embodiment, this condition may be exemplified by the end of the shifting control of the auxiliary transmission 50 or the lapse of a predetermined period of time. The end of the shifting control may also be determined by the result of a comparison of either the number of revolutions depending upon the signal received by the auxiliary transmission rotation sensor 52 or the hydraulic pressure depending upon the signal received by the auxiliary transmission operation sensor 53. On the other hand, the predetermined time period may be an experimentally measured time period such as the time period required for the hydraulic pressure to be restored. In case the judgement result of this step 113 is NO, the process flow is returned to the preceding step 111 to maintain the forbiddance of the shifting control of the 2-4 shifter 9.

In case the determination result of step 113 is YES or in case the determination result of the preceding step 110 is N, it is determined (at a step 114) whether or not the control responding to the signal inputted in accordance with the operation of the shift lever is to shift the two- and four-wheel drives. The process flow is returned to the initial step if the determination result of step 114 is NO, but a new shifting control of the auxiliary transmission 50 is forbidden (at a step 115) if the determination result is YES. This forbiddance of the shifting control of the auxiliary transmission 50 may be effected like the aforementioned forbiddance of the gear ratio changing control of the automatic transmission 5 by maintaining an appropriate solenoid valve of the auxiliary transmission controller 51 as it is magnetized or demagnetized. In this forbidden control mode, the clutch C-4 is applied to execute the shifting control of the 2-4 shifter 9 (at a step 116) by deenergizing the aforementioned solenoid valve S of FIG. 3, for example. At step 117 for determining whether or not a predetermined condition is satisfied, the forbiddance of a new shifting control at the auxiliary transmission 50 is maintained. Then, the process flow is returned to the initial step if the determination result of the step 117 is YES.

Figure 7:
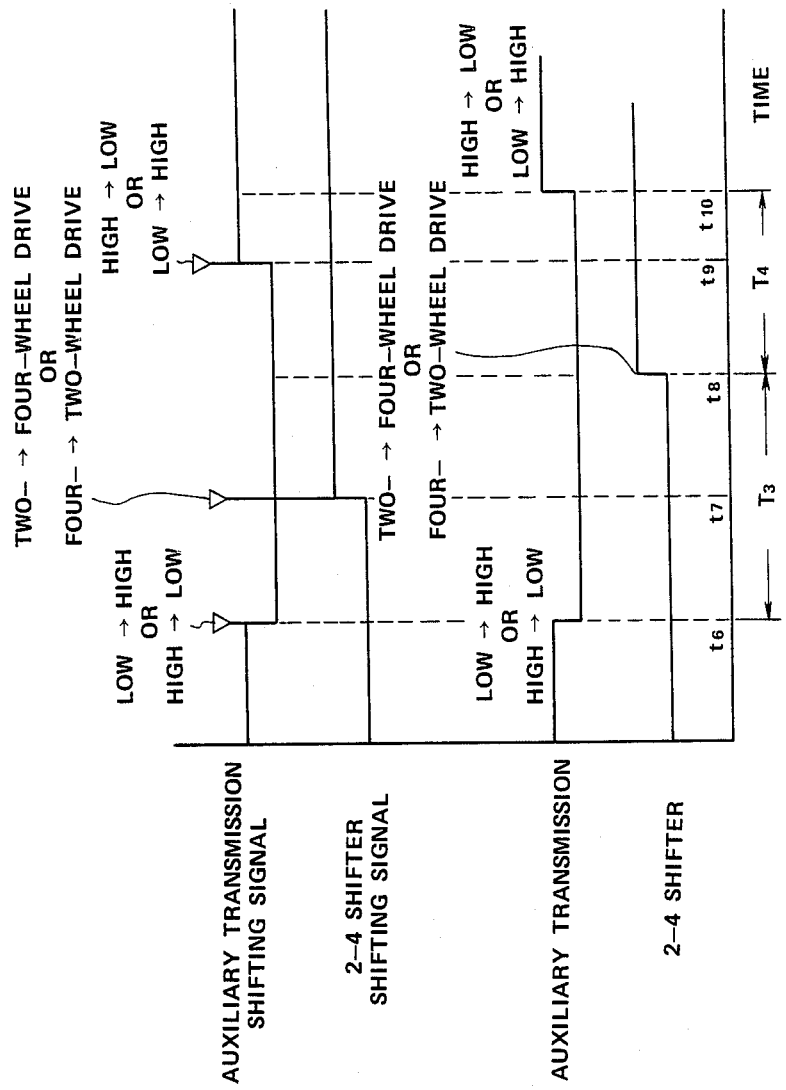
FIG. 7 is a time chart showing the method shown in FIG. 5.

The time charts depicting the output timings of the individual signals of the aforementioned controls and the operation timings of the auxiliary transmission 50 and the 2-4 shifter 9 are shown in FIG. 7. In case the signal for shifting the auxiliary transmission 50 from the low-speed drive (Low) to the high-speed drive (High) or vice versa precedes to the signal for shifting the 2-4 shifter 9 from the two-wheel drive (2WD) to the four-wheel drive (4WD) or vice versa, the shifting control of the auxiliary transmission 50 is started at a point of time $t_6$ in response to the auxiliary transmission shifting signal. Even if the 2-4 shifter shifting signal is generated at a point of time $t_7$ during a period of forbiddance $T_3$ from the time point $t_6$ until the aforementioned condition is satisfied, the 2-4 shifter 9 does not conduct its shifting operation. At a point of time $t_8$ when the condition is satisfied, i.e., when the forbiddance period $T_3$ has elapsed, the shifting operation of the 2-4 shifter 9 is effected. Once the shifting control of the 2-4 shifter 9 is started, the shift of the auxiliary transmission 50 is forbidden, even if the shifting signal of the auxiliary transmission 50 is generated at a point of time $t_9$ during a forbiddance period $T_4$ continuing until the aforementioned condition is satisfied. The shift of the auxiliary transmission is started at a point of time $t_{10}$ when the condition is satisfied, i.e., when the forbiddance period $T_4$ has elapsed. From now on, the speed shifting control of the auxiliary transmission 50 and the shifting control of the 2-4 shifter 9 are not conducted simultaneously. One of them is forbidden during forbiddance periods $T_3$ and $T_4$. Thus, since the aforementioned speed and wheel shifting controls do not occur simultaneously, the hydrauilc pressure will not drop substantially, thereby those controls can be conducted individually under their specified pressures.

Figure 8:
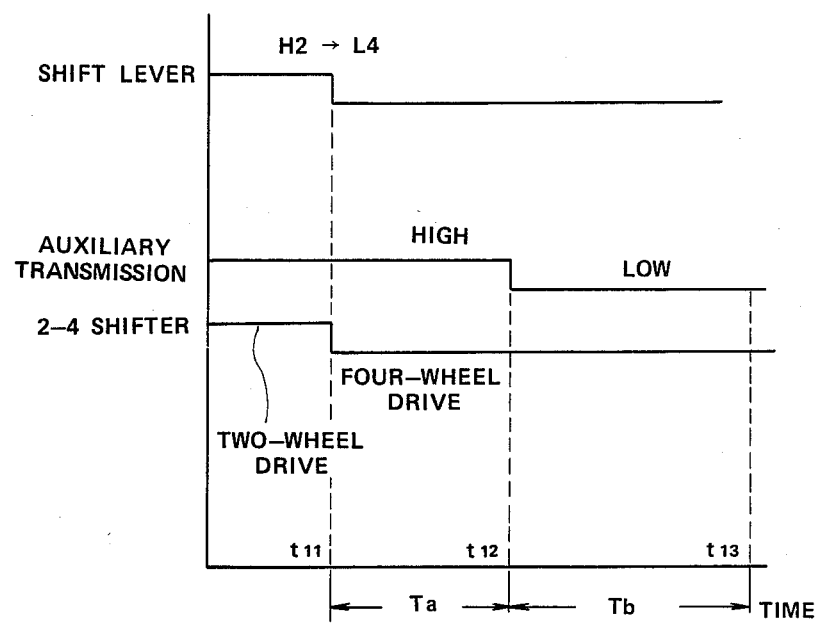
FIGS. 8 and 9 are time charts showing the case in which the order of precedence is set for the controls of the two- and four-wheel drive shifting device and the auxiliary transmission.
Figure 9:
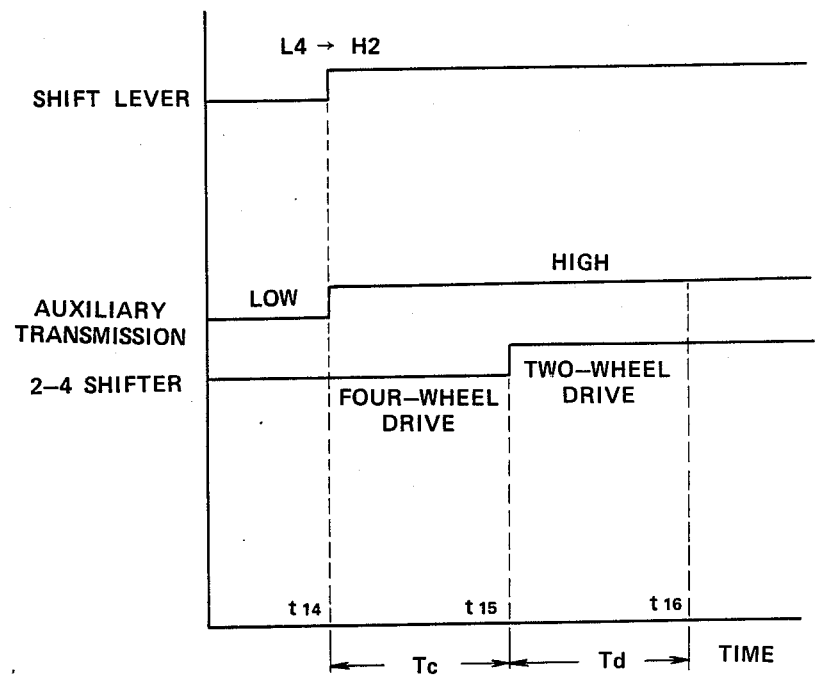

Incidentally, in the constructions disclosed in the foregoing specification of Japanese Patent Application No. 7772/1985 and shown in FIG. 3, the shifts at the auxiliary transmission and the 2-4 shifter accompanying the shifting operation of H2 to L4 or L4 to H2 occur simultaneously. In case the aforementioned controls are to be conducted for the system having such construction, it is preferable that the shifting controls of the auxiliary transmission and the 2-4 shifter be executed not in the signal inputting order but by setting the order of precedence under another condition. More specifically, the torque fluctuations of each wheel are reduced if the speed shifting control is conducted in the mode of the four-wheel drive. It is therefore preferable that the auxiliary transmission 50 be shifted for the shift of H2 to L4 or L4 to H2 with the 2-4 shifter 9 being set in the four-wheel drive mode. Accordingly, in the case of the shift of H2 to L4, for example, as shown in FIG. 8, the 2-4 shifter 9 is first caused to conduct a shift to the four-wheel drive mode. The period from a starting point of time $t_{11}$ of the shifting operation to the instant when a predetermined condition is satisfied is set as a forbiddance period $T_a$. At a point of time $t_{12}$ when the forbiddance period $T_1$ has elapsed, the auxiliary transmission 50 is shifted from the high- to low-speed drive modes. Then, shifting control of the 2-4 shifter 9 is made possible on or after a point of time $t_{13}$ after lapse of a forbiddance period $T_b$ from the start of the shifting operation of the auxiliary transmission 50 until a predetermined condition is satisfied. For the shift from L4 to H2, on the contrary, the auxiliary transmission 50 is first shifted at a point of time $t_{14}$ from the low-speed drive mode to the high-speed drive mode in response to the signal based upon the operation of the shift lever, as shown in FIG. 9. At a point of time $t_{15}$ after lapse of a forbiddance period $T_c$ from the shift starting time point $t_{14}$ until a predetermined condition is satisfied, the 2-4 shifter 9 is shifted from the four-wheel drive mode to the two-wheel drive mode. Then, a new shifting control of the auxiliary transmission 50 is made possible on or after a point of time $t_{16}$ after lapse of a forbiddance period $T_d$ from that time point $t_{15}$ until a predetermined condition is satisfied.

In the control methods shown in FIGS. 8 and 9, the shifting control of the auxiliary transmission 50 is conducted in the four-wheel drive mode so that the torque fluctuations of each wheel can be reduced to stabilize the shifting control.

Incidentally, the individual embodiments thus far described are directed to the part-time four-wheel drive vehicle in which the drive is shifted between the two- and four-wheel drives. Despite of this fact, however, the method of the present invention can also be applied to the full-time drive vehicle in which the four-wheel drive mode is maintained at all times. On the full-time four-wheel drive vehicle, more specifically, there are installed both a differential mechanism (i.e., a center differential) for preventing the braking phenomena due to the difference in the number of revolutions between the front and rear wheels and a mechanism (i.e., a differential locking mechanism) for blocking the action of the center differential so as to prevent the four-wheel drive mode from becoming impossible due to the idle revolutions of the front or rear wheels. In case a friction engagement device is used as the differential locking mechanism, the distribution ratio of the drive force between the front and rear wheels can be varied by adjusting the frictional force. Then, the gear ratio changing control and the distribution control by the frictional engagement device can be conducted such that they are not executed simultaneously by setting the predetermined forbiddance periods, as has been described in the foregoing embodiments. Thus, the distribution ratio can be precisely controlled because the hydraulic pressure is stable.

As has been described hereinbefore, according to the method of the present invention, the distribution control of the drive force between the front and rear wheels and the gear ratio change control can be executed with the predetermined time delay. As a result, the hydraulic pressure for those controls will not temporarily drop to an extremely low level so that the individual controls can be conducted stably, as desired. As a result, satisfactory gear ratio changing characteristics can be attained while enjoying the merit intrinsic to the four-wheel drive vehicle.

What is claimed is:

1. A method for controlling a four-wheel drive vehicle, comprising the steps of:
   (a) hydraulically commencing controls of one of the drive force distribution between the front and rear wheels of the vehicle and the gear ratio change of a transmission of the vehicle; and
   (b) after one of said drive force distribution and gear ratio change controls has commenced, forbidding the other said control from commencing until a predetermined condition is satisfied.

2. A method for controlling a four-wheel drive vehicle according to claim 1, wherein said predetermined condition is one of the group consisting of the lapse of a predetermined period of time and the end of said one control.

3. A method for controlling a four-wheel drive vehicle according to claim 2, wherein said end of the control is determined by a comparison of one of the number of revolutions in said transmission and the hydraulic pressure.

4. A method for controlling a four-wheel drive vehicle according to claim 1, wherein said drive force distribution control controls one of the shift of two- and four-wheel drives and the adjustment of the distribution ratio of said drive force between the front and rear wheels of said vehicle.

5. A method for controlling a four-wheel drive vehicle according to claim 1, wherein the gear ratio change control controls one of manual and automatic changes of said gear ratio and a shift between high- and low-speed drives.

6. A method for controlling a four-wheel drive vehicle according to claim 5, wherein said shift between the high- and low-speed drives is conducted with the shift between the two- and four-wheel drives being fixed in the four-wheel drive mode.

7. A method for controlling a four-wheel drive vehicle according to claim 6, wherein for the shift from a high-speed two-wheel drive to a low-speed four-wheel drive, the shift from the high-speed drive to the low-speed drive is preceded by the shift from the two-wheel drive to the four-wheel drive.

8. A method for controlling a four-wheel drive vehicle according to claim 6, wherein for the shift from the low-speed four-wheel drive to the high-speed two-wheel drive, the shift from the four-wheel drive to the two-wheel drive is preceded by the shift from the low-speed drive to the high-speed drive.

9. A method for controlling a four-wheel drive vehicle according to claim 1, wherein commencement of said one control commences changes in one of the behaviors of an object of said transmission to be controlled, the output of a control signal, the level of the hydraulic pressure upon said object, and the number of revolutions and torque of said object.

10. A method for controlling a four-wheel drive vehicle according to claim 1, wherein the routine of one of said drive force distributing control and said gear ratio change control precedes the other.

11. A control method for a four-wheel drive vehicle according to claim 1, wherein the routines of said drive force distribution control and said gear ratio change control are executed independently of each other, in an order of precedence determined by a signal inputted earlier.

12. A control for a four-wheel drive vehicle, comprising:
(a) means for selectively hydraulically controlling the drive force distribution between the front and rear wheels of the vehicle and the gear ratio change of a transmission of the vehicle; and
(b) means for forbidding the control of the non-selected one of said drive force distribution and the gear ratio change until a predetermined condition is satisfied.

13. A control for a four-wheel drive vehicle according to claim 12, further comprising:
means for detecting the lapse of a predetermined period of time; and
means for detecting the end of said selected control; wherein said predetermined condition is satisfied by at least one of the detection of said predetermined time lapse and said end of said selected control.

14. A control for a four-wheel drive vehicle according to claim 13, wherein said means for detecting the end of the selected control comprises means for comparing one of a number of revolutions in said transmission and the hydraulic pressure.

15. A control for a four-wheel drive vehicle according to claim 12, wherein said drive force distribution control comprises:
means for shifting between the two- and fourwheel drives and the low- and high-speed drives; and
means for adjusting the distribution ratio of said drive force between the front and rear wheels of said vehicle.

16. A control for a four-wheel drive vehicle according to claim 12, wherein said gear ratio change control of said transmission controls one of means for manually and automatically changing said gear ratio and a shift between high and low speed drives.

17. The method according to claim 12, wherein said means for forbidding said drive force distribution comprises a timing valve and a solenoid valve.

18. The method according to claim 17, wherein opening said solenoid valve releases oil pressure from an oil chamber of said timing valve to prevent oil pressure from being applied to a two- and four-wheel drive shifting clutch to forbid said drive force distribution.

19. The method according to claim 18, wherein
closing said solenoid valve supplies oil pressure to said oil chamber of said timing valve so that oil pressure is applied to said clutch.

* * * * *